US011328269B2

(12) United States Patent
Zamer

(10) Patent No.: US 11,328,269 B2
(45) Date of Patent: May 10, 2022

(54) SYSTEMS AND METHODS FOR DYNAMIC EVENT ATTENDANCE MANAGEMENT

(71) Applicant: STUBHUB, INC., San Francisco, CA (US)

(72) Inventor: Kamal Zamer, Austin, TX (US)

(73) Assignee: STUBHUB, INC., San Francisco, CA (US)

( * ) Notice: Subject to any disclaimer, the term of this patent is extended or adjusted under 35 U.S.C. 154(b) by 556 days.

(21) Appl. No.: 14/096,335

(22) Filed: Dec. 4, 2013

(65) Prior Publication Data
US 2015/0154571 A1 Jun. 4, 2015

(51) Int. Cl.
G06Q 10/02 (2012.01)
G06Q 20/04 (2012.01)
G06Q 30/06 (2012.01)
G06Q 20/32 (2012.01)

(52) U.S. Cl.
CPC ........... *G06Q 20/045* (2013.01); *G06Q 10/02* (2013.01); *G06Q 20/3224* (2013.01); *G06Q 30/0601* (2013.01)

(58) Field of Classification Search
CPC .. G06Q 20/045; G06Q 10/02; G06Q 20/3224; G06Q 30/0601
See application file for complete search history.

(56) References Cited

U.S. PATENT DOCUMENTS

| 7,216,109 | B1 * | 5/2007 | Donner | G06Q 10/02 235/382 |
| 7,406,433 | B2 | 7/2008 | Mashimo et al. | |
| 2002/0138325 | A1 * | 9/2002 | Mashimo | G06Q 10/02 705/5 |
| 2008/0033771 | A1 * | 2/2008 | Barry | G06Q 10/02 705/5 |

(Continued)

FOREIGN PATENT DOCUMENTS

| JP | 2005-056166 A | 3/2005 |
| JP | 2006-293655 A | 10/2006 |
| KR | 10-2013-0020385 A | 9/2014 |

OTHER PUBLICATIONS

Pascal Courty, Some Economics of Ticket Resale, 2003, Journal of Economic Perspectioves, vol. 17, No. 2, pp. 85-97 (Year: 2003).*

(Continued)

*Primary Examiner* — Rupangini Singh
(74) *Attorney, Agent, or Firm* — McDermott Will & Emery LLP

(57) ABSTRACT

A ticket seller system can offer an enhanced event experience for users of the system by tracking the locations of ticketholders before and during an event to offer ticket resale and seat upgrade opportunities to the users. The locations of users can be harnessed to offer enhanced value to event attendees and to allow event owners to maximize the use of their venue during an event by offering new upgrades and resale options to patrons. Users who might miss an event and otherwise lose all of their ticket value can be detected, based (Continued)

on their location, and offered an opportunity to recoup some of the cost by reselling the tickets. Event attendees who desire to upgrade their seats at an event can be offered the opportunity to purchase upgrade tickets for seats that have been vacated by other attendees that have left the event while the event is ongoing.

12 Claims, 9 Drawing Sheets

(56) References Cited

U.S. PATENT DOCUMENTS

| | | | | |
|---|---|---|---|---|
| 2008/0147530 | A1 | 6/2008 | Kwan et al. | |
| 2008/0248815 | A1* | 10/2008 | Busch | G06Q 30/0261 455/456.5 |
| 2010/0015993 | A1* | 1/2010 | Dingler | G06Q 10/109 455/456.1 |
| 2011/0125538 | A1* | 5/2011 | Joao | G06Q 10/02 705/5 |
| 2012/0078667 | A1* | 3/2012 | Denker | G06Q 10/02 705/5 |
| 2012/0136682 | A1* | 5/2012 | Harris | G06Q 30/08 705/5 |
| 2012/0185394 | A1* | 7/2012 | Gelfand | G06Q 10/02 705/44 |
| 2013/0260795 | A1* | 10/2013 | Papakipos | H04W 4/023 455/456.3 |
| 2014/0222475 | A1* | 8/2014 | Orkin | G06Q 30/0629 705/5 |
| 2014/0379390 | A1* | 12/2014 | Scarborough | G06Q 30/0639 705/5 |

OTHER PUBLICATIONS

Response to First Examination Report filed Jul. 31, 2017 for Australian Patent Application No. 2014357377 dated Nov. 23, 2016, 22 pgs.
Second Examination Report received for Australian Patent Application No. 2014357377 dated Sep. 4, 2017, 3 pgs.
Communication Pursuant to Article 94(3) received for European Patent Application No. 14868146.3 dated Jan. 24, 2018, 7 pgs.
Response to Communication Pursuant to Article 94(3) EPC filed Jun. 4, 2018, for European Patent Application No. 14868146.3, dated Jan. 24, 2018, 5 pgs.
International Search Report and Written Opinion, as issued in connection with International Patent Application No. PCT/US2014/067979, dated Mar. 6, 2015, 8 pgs.
Australian Patent Examination Report No. 1, as issued in connection with Australian Application No. 2014357377, dated Nov. 23, 2016, 3 pgs.
European Extended Search Report, as issued in connection with European Application No. 14868146.3, dated Apr. 12, 2017, 8 pgs.
Chinese Office Action, as issued in connection with Chinese Application No. 201480066461.7, dated Apr. 2, 2020, 18 pgs.
Canadian Office Action, as issued in connection with Canadian Application No. 2,931,957, dated Feb. 5, 2021, 5 pgs.
Chinese Decision of Rejection, as issued in connection with Chinese Application No. 201480066461.7, dated Dec. 22, 2020, 7 pgs.
Korean IP Office, Notice of Preliminary Rejection for related Korean Application No. 10-2016-7014829; dated Mar. 18, 2021; 13 pgs. (with English-Korean translation).

* cited by examiner

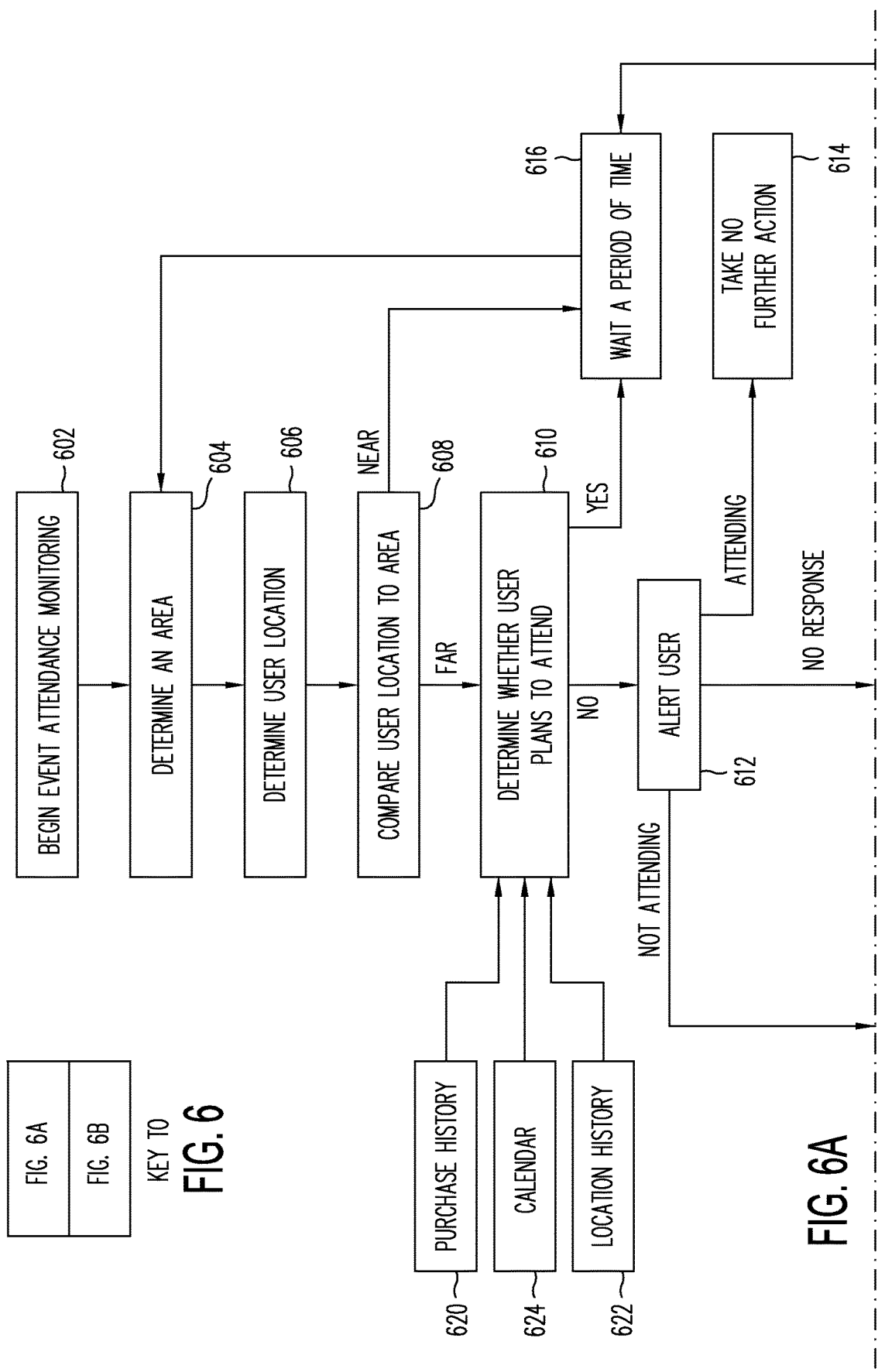

SYSTEMS AND METHODS FOR DYNAMIC EVENT ATTENDANCE MANAGEMENT

BACKGROUND

Technical Field

The present disclosure relates generally to electronic commerce, and more particularly, to the redistribution of purchased event tickets.

Related Art

Computer systems and networks have facilitated the tasks of buying, selling and transferring goods. For example, global computer networks, such as the Internet, have allowed purchasers to relatively quickly and efficiently seek and purchase goods online. Similarly, global computer networks provide an efficient and cost-effective medium for sellers to advertise, offer, provide, and sell their goods. Electronic commerce companies provide buyers and sellers with online services and the infrastructure to accept orders of goods from remote purchasers, to perform the financial transactions necessary to confirm and complete the sale of goods, to ship or distribute the goods to remote purchasers, and to perform other related logistics.

One example of a market for goods within the realm of electronic commerce is the online ticket market. Various online ticket sellers provide websites through which parties can buy and sell tickets online. These tickets can be obtained by a user to reserve seats and/or admission for a variety of live events, such as sporting events, concerts, theater events, and other entertainment events. Typically, a buyer looks for available tickets on a ticket marketplace website or other online listing and decides which, if any, of the available tickets are of interest to the buyer for possible purchase.

Tickets for ticketed events are typically sold well in advance of the event. For example, a fan of a musical artist will often purchase tickets for a performance of that musical artist at a venue months in advance. Due to a wide variety of circumstances, purchased tickets often go unused by the ticket purchaser. Ticket purchasers can knowingly or unknowingly fail to attend a ticketed event for which they have purchased tickets or, even when attending the event, can leave the event early leaving empty seats at the event. Conventionally, it is necessary for the ticket purchaser to determine that they will not be attending the event if they wish to resell the tickets. However, in some circumstances a ticket purchaser can forget about an event, underestimate the time it would take to reach an event, or unexpectedly leave the event early. In these cases there is no mechanism by which the purchaser can recoup any of the money spent on the tickets and no way in which the event venue can fill the unused seat or seats associated with the unused or underused tickets.

It may therefore be desirable to provide systems and methods for redistributing unused, partially used, and/or potentially unused tickets for various ticketed events.

DETAILED DESCRIPTION

Figure 1:
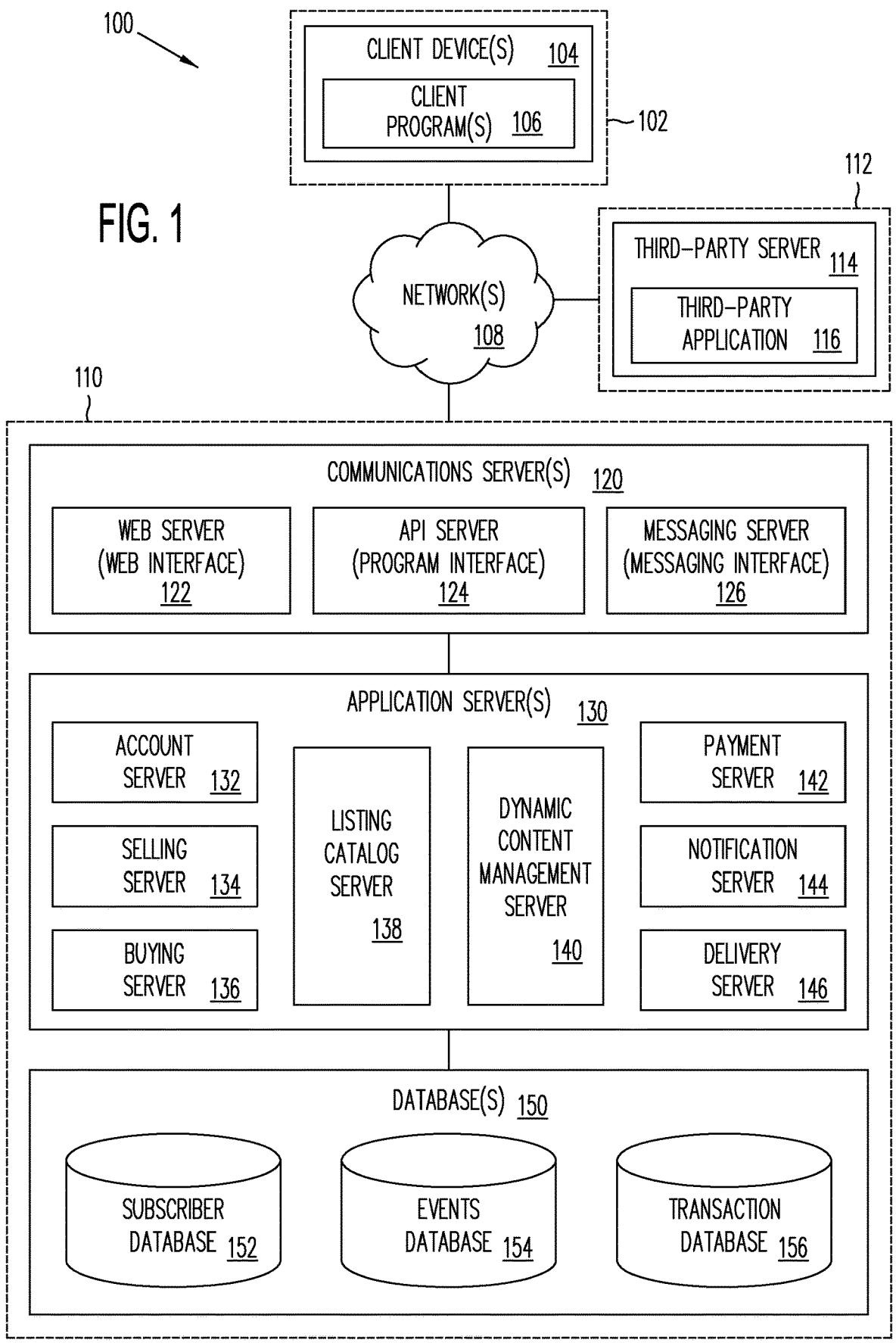
FIG. 1 is a block diagram of an illustrative computing system that is adapted for implementing the selection and purchase of tickets for ticketed events using enhanced ticket information according to an embodiment.

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used, and changes may be made without departing from the spirit and scope of the invention.

Devices, systems and methods are provided for performing activities related to the online sale, purchase, and resale of tickets to ticketed events. In various particular embodiments, the devices, systems or methods can involve one or more devices in communication over a network. Such devices, systems, and methods can facilitate the selection and purchase of tickets to various ticketed events and location-based resale activities associated with purchased tickets.

Location-based resale activities can include pre-event location-based resale activities, event-concurrent location-based resale activities, or other location-based resale activities in which a location of a user that has a ticket for a seat at an event is determined and, based on the determined location, an additional ticket (e.g., a resale ticket or an upgrade ticket) for the seat is offered for sale.

Pre-event location-based resale activities may include determining, based on a detected location of a ticket purchaser, that the ticket purchaser is unlikely or unable to attend an event, alerting the ticket purchaser of ticket resale possibilities, buying back the tickets from the ticket purchaser, and reselling the tickets as resale tickets. Reselling the tickets may include selling the tickets to new ticket purchasers or offering the tickets as upgrade resale tickets to other ticket purchasers for the event.

Event-concurrent location-based resale activities may be activities associated with reselling tickets to attendees who are currently at the event as upgrade tickets. Event-concurrent location-based resale activities may include determining, based on a detected location of an event attendee, that the event attendee has left or is leaving an event (thereby abandoning the tickets purchased by that event attendee and vacating the associated seats in the venue), optionally alerting the leaving attendee of ticket resale options, and offering, as upgrade tickets, the leaving attendee's seat to other attendees currently within the event venue. In various embodiments, the price of upgrade tickets may be determined based on the amount of time left in the event, the proximity of the upgrade ticket seats to the attraction, and/or the popularity of other upgrade tickets (as examples).

In various embodiments, a system may determine a location of a user that has a ticket for a seat at an event, determine, based at least in part on the location, that the seat will be unused for all or a portion of the event, optionally receive a confirmation from the user that the seat can be resold, and offer the seat for sale to another user. It may be determined that the seat will be unused for all of the event at least in part by determining that the location of the user at a time prior to the event is outside of a predetermined area around an event venue. It may be determined that the seat will be unused for a portion of the event at least in part by determining that the location of the user is outside of the event venue at a time during the event, thereby indicating that the user has left the event while the event is ongoing.

Pre-event location-based resale activities and/or event-concurrent location-based resale activities of this type can help ticket purchasers reduce financial loss when a purchased ticket can't be used and can help event venue owners maximize attendance and efficiently manage the distribution of tickets for available seats before and during ticketed events. These types of location-based ticket resale activities can help a venue owner manage event attendance so that every seat for an event is occupied by an event attendee.

While the various examples disclosed herein focus on particular aspects regarding the online sale and/or purchase of tickets, it will be understood that the various inventive principles and embodiments disclosed herein can be applied to other types of ticketed applications and arrangements as well. For example, a ticket purchase that is performed in person or on a closed or proprietary computing system may utilize one or more of the aspects and features found in the various systems and methods provided.

Reference throughout the specification to "various embodiments," "some embodiments," "one embodiment," "an embodiment," "various examples," "one example," "an example," or "some examples" means that a particular feature, structure, or characteristic described in connection with the embodiment or example is included in at least one embodiment. Thus, appearances of these are not necessarily all referring to the same embodiment. Furthermore, the particular features, structures or characteristics may be combined in any suitable manner in one or more embodiments.

According to an embodiment, a computer program product can comprise a non-transitory machine readable medium. The non-transitory machine readable medium can have computer readable and executable code for instructing one or more processors to perform any of the methods disclosed herein.

Beginning with FIG. 1, an exemplary embodiment of a computing system adapted for implementing the selection and purchase of tickets for ticketed events and/or the location-based resale of tickets for ticketed events is illustrated in block diagram format. As shown, a computing system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Computing system 100 can include, among various devices, servers, databases and other elements, a client 102 that may comprise or employ one or more client devices 104, such as a laptop, a mobile computing device, a PC, and/or any other computing device having computing and/or communications capabilities in accordance with the described embodiments. In particular, it is specifically contemplated that client devices 104 can include a cellular telephone or other similar mobile device that a user can carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging), contacts application, calendar application, electronic document application, database application, media application (e.g., music, video, television), location-based services (LBS) application (e.g., GPS, mapping, directions, point-of-interest, locator), and so forth. One or more of client programs 106 may display various graphical user interfaces (GUIs) to present information to and/or receive information from one or more of client devices 104.

As shown, client 102 can be communicatively coupled via one or more networks 108 to a network-based system 110. Network-based system 110 may be structured, arranged, and/or configured to allow client 102 to establish one or more communications sessions with network-based system 110 using various computing devices 104 and/or client programs 106. Accordingly, a communications session between client 102 and network-based system 110 (e.g., a communications session for location-based selection, sale, and/or purchase of tickets for a ticketed event) may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data and/or voice communications between client 102 and the network-based system 110 may be sent and received over one or more networks 108 such as the Internet, a WAN, a WWAN, a WLAN, a mobile telephone network, a landline telephone network, a VoIP network, as well as other suitable networks. For example, client 102 may communicate with network-based system 110 over the Internet or other suitable WAN by sending and or receiving information via interaction with a web site, e-mail, IM session, and/or video messaging session. Any of a wide variety of suitable communication types between client 102 and system 110 can take place, as will be readily appreciated. In particular, wireless communications of any suitable form may take place between client 102 and system 110, such as that which often occurs in the case of mobile phones or other personal mobile devices.

In various embodiments, computing system 100 can include, among other elements, a third party 112, which may comprise or employ a third-party server 114 hosting a third-party application 116. In various implementations, third-party server 114 and/or third-party application 116 may host a web site associated with or employed by a third party 112. For example, third-party server 114 and/or third-party application 116 may enable network-based system 110 to provide client 102 with additional services and/or information, such as additional ticket inventory. Third-party server 114 and/or third-party application 116 may provide system 110 and/or client 102 with email services and/or information, social networking services and/or information, travel services and/or information, purchase services and/or information, or other online services and/or information.

In one embodiment, third party server 112 may include a social networking server that hosts a user's social network account. In another embodiment, third party server 112 may include an email server that hosts a user's email account. In yet another embodiment, third party server 112 may include a travel website such as an airline website, a train company website, or other travel website that offers travel services for sale, or other information such as flight schedules, flight statutes, traffic information or train schedules (as examples). In some embodiments, one or more of client programs 106 may be used to access network-based system 110 via third party 112. For example, client 102 may use a web client to access and/or receive content from network-based system 110 after initially communicating with a third-party web site 112.

Network-based system 110 may comprise one or more communications servers 120 to provide suitable interfaces that enable communication using various modes of communication and/or via one or more networks 108. Communications servers 120 can include a web server 122, an API server 124, and/or a messaging server 126 to provide interfaces to one or more application servers 130. Application servers 130 of network-based system 110 may be structured, arranged, and/or configured to provide various online marketplace and/or ticket fulfillment services to users that access network-based system 110. In various embodiments, client 102 may communicate with applications servers 130 of network-based system 110 via one or more of a web interface provided by web server 122, a programmatic interface provided by API server 124, and/or a messaging interface provided by messaging server 126. It can be appreciated that web server 122, API server 124, and messaging server 126 may be structured, arranged, and/or configured to communicate with various types of client devices 104 and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, and so forth, and messaging server 126 may provide a messaging interface to enable access by client 102 and/or third party 112 to the various services and functions provided by application servers 130.

When implemented as an online ticket marketplace, application servers 130 of network-based system 110 may provide various online marketplace and ticket fulfillment services including, for example, account services, buying services, selling services, listing catalog services, dynamic attendance management services, delivery services, payment services, gathering services, location-based services, and notification services. Application servers 130 may include an account server 132, a selling server 134, a buying server 136, a listing catalog server 138, a dynamic content management server 140, a payment server 142, a notification server 144, and/or a delivery server 146 structured and arranged to provide such online marketplace and ticket fulfillment and/or redistribution services.

Application servers 130, in turn, may be coupled to and capable of accessing one or more databases 150 including a subscriber database 152, an active events database 154, and/or a transaction database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
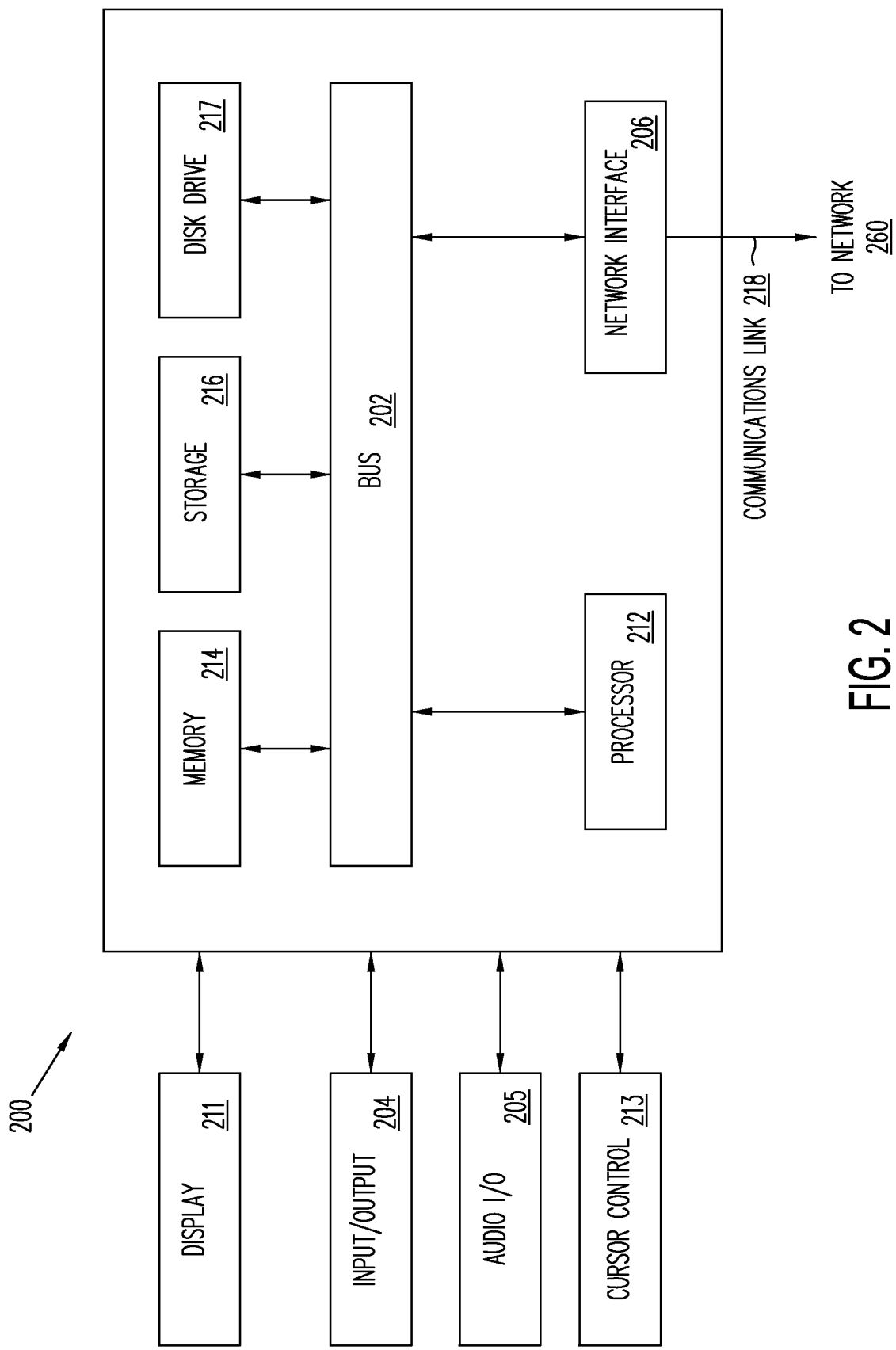
FIG. 2 is a block diagram of an illustrative computer system suitable for implementing on one or more devices of the computing system in FIG. 1 according to an embodiment.

Continuing with FIG. 2, an exemplary computer system 200 suitable for implementing on one or more devices of the computing system in FIG. 1 is depicted in block diagram format. In various implementations, a device that includes computer system 200 may comprise a personal computing device (e.g., a smart or mobile phone, a computing tablet, a personal computer, laptop, PDA, Bluetooth device, key FOB, badge, etc.) that is capable of communicating with a network. The ticket provider and/or a payment provider may utilize a network computing device (e.g., a network server) capable of communicating with the network. It should be appreciated that each of the devices utilized by users, ticket providers, and payment providers may be implemented as computer system 200 in a manner as follows.

Computer system 200 can include a bus 202 or other communication mechanism for communicating information data, signals, and information between various components of computer system 200. Components include an input/output (I/O) component 204 that processes a user action, such as selecting keys from a keypad/keyboard, selecting one or more buttons or links, etc., and sends a corresponding signal to bus 202. I/O component 204 may also include an output component, such as a display 211 and a cursor control 213 (such as a keyboard, keypad, mouse, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, a venue server, an email server, a social networking server, other third-party servers, and/or a payment provider server via a network. In various embodiments, such as for many cellular telephone and other mobile device embodiments, this transmission can be wireless, although other transmission mediums and methods may also be suitable. A processor 212, which can be a micro-controller, digital signal processor (DSP), or other processing component, processes these various signals, such as for display on computer system 200 or transmission to other devices over a network 260 via a communication link 218. Again, communication link 218 can simply be a wireless communication form in some embodiments. Processor 212 may also control transmission of information, such as cookies or LP addresses, to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in non-transitory machine-readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof can be used to implement a ticket resale operation such as the location-based resale of tickets for seats at events using detected locations of ticket purchasers.

Figure 3:
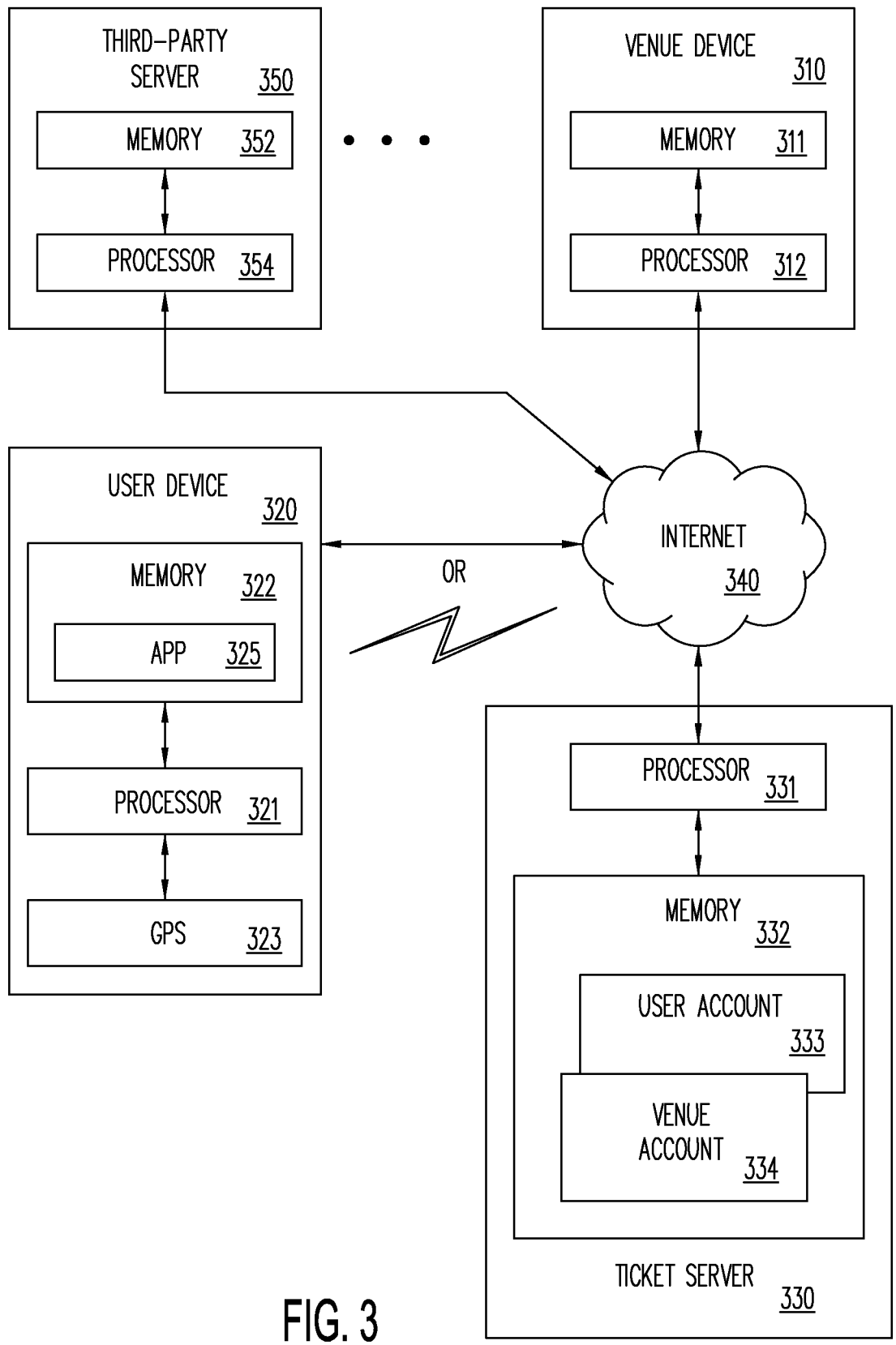
FIG. 3 is a block diagram of an illustrative system for facilitating selection, purchase, and redistribution of tickets for ticketed events according to an embodiment.

FIG. 3 is a block diagram showing a ticket selection and purchase system that may be used to determine the location of a ticket purchaser before and/or during an event and, based on the determined location, take suitable ticket resale action, according to an embodiment. As shown in FIG. 3, a ticket server 330 may be in communication with one or more user devices such as user device 320, one or more venue devices such as venue device 310, and one or more third-party servers such as third-party server 350.

In some embodiments, a venue device such as a venue device 310 can be present at each of a plurality of different event venues (e.g., stadiums, theaters, arenas, amphitheaters, or other venues at which ticketed events are held). Venue device 310 can provide information regarding events scheduled to occur at a particular venue and regarding seating at that venue. In some embodiments, venue device 310 can provide the information to a ticker server 330. Ticket server 330 can obtain information regarding events scheduled to occur at various venues and information regarding seating at the various venues from one or more venue devices 310, from other sources, or ticket server 330 may have a database of event information and venue information independent of any interaction with a venue device. Ticket server 330 may, for example, be an implementation of system 110 of FIG. 1.

Venue device 310 can be a computer, a server, a computing tablet, or a mobile device, as examples. Venue device 310 can have processing circuitry such as processor 312 and storage such as memory 311. Processor 312 can execute a software program stored in memory 311 for providing information regarding events scheduled to be at the venue and regarding seating at the venue for each scheduled event. Venue device 310 can provide the information to the ticket server and/or to a user device such as user device 320.

Venue device 310 can be disposed at the venue. However, this is merely illustrative. If desired, venue device 310 can be disposed at a location other than the venue. Each venue can have a dedicated venue device 310 or a plurality of different venues can share a common venue device 310. For example, co-owned venues can share a common venue device 310.

In some embodiments, venue device 310 can be omitted if ticket server 330 has the information needed for buying and selling of tickets. For example, ticket server 330 may have a database of available tickets and information about the tickets and venues that enables ticket server 330 to provide the necessary information to a user for purchasing tickets to events at venues.

Third party servers such server 350 may include, for example, a social media server that hosts one or more social networking accounts (e.g., a social networking account for a user of user device 320), an email server that hosts email services (e.g., an email account for the user), and/or a travel services server. A user may use user device 320 to access a social networking site that is hosted by one of servers 350, to send, store, and receive emails or other electronic communications on an email account that is hosted by one of servers 350, to research and/or purchase travel services, and/or other services on one of servers 350. The user may also use user device 320 to access ticket server 330 to select and purchase tickets for ticketed events from ticket server 330, to sell tickets for ticketed events, to purchase upgrade tickets for seats at a venue and/or to purchase resale tickets for seats at a venue (as examples).

Third party server 350 can be a computer, a server, a computing tablet, or a mobile device, as examples. Server 350 can have processing circuitry such as processor 354 and storage such as memory 352.

A processor 354 on a server 350 can execute one or more software programs stored in memory 352 for publishing user photos, videos, comments, captions, or other data such that are posted by the user. A processor 354 on another server 350 can store (e.g., using memory 352) and route emails or other communications for the user.

In one embodiment, servers 350 can be omitted if ticket server 330 has the information (e.g., seat information) needed determine whether a ticket purchaser is likely to attend an event. For example, ticket server 330 may have a database of purchases and/or user device information gathered from user device 320 that indicates that the user is likely or unlikely to attend an event or is leaving or has left an event.

A user (e.g., a potential ticket purchaser) can use a device such as a user device 320 to shop online for available tickets such as new tickets, resale tickets, and/or upgrade tickets for one or more events. User device 320 can be a mobile device such as a cellular telephone, a tablet computer, a laptop computer, or another portable computing device. User device 320 can be a non-mobile device such as a home (land line) telephone, a desktop computer, an interactive set top box, or the like. User device 320 can be any device or combination of devices that facilitate online ticket purchasing. User device 320 may, for example, be an implementation of client device 104 of FIG. 1.

User device 320 can have a processor 321, a memory 322, a global positioning system component (GPS) 323 and/or other suitable device components. Processor 321 can execute an application such as an app 325 that facilitates the ticket selection and/or purchase methods disclosed herein. App 325 can be stored in memory 322. App 325 can provide a graphical user interface (GUI) for the user when the user is selecting and purchasing tickets online. If desired, app 325 can be a dedicated ticket purchasing app. However, this is merely illustrative. In some configurations, app 325 can be part of another app, such as a Paypal, Inc. payment provider app.

User device 320 can communicate with venue device 310, third-party server 350, and/or ticket server 330 via a network. For example, user device 320 can communicate with venue device 310, third-party server 350, and/or ticket server 330 via the Internet 340. User device 320 can communicate with the Internet via either a wired connection or a wireless connection. App 325 may be configured to transmit to ticket server 330 location information of user device 320. For example, ticket server 330 may have access to location information for a user based on location data from GPS 323.

Ticket server 330 may be operated by an online ticket seller such as StubHub, Inc. Ticket server 330 can facilitate online ticket sales. Ticket server 330 may include processing circuitry such as a processor 331 in communication with storage such as a memory 332. Processor 331 can include one or more processors. Processor 331 can access accounts such as a user account 333 and/or a venue account 334 that are stored in memory 332. User account 333 can include information regarding the user (e.g., identification information, preferences, account numbers, purchase history, social network contacts, email contacts, email account permissions, social media account permissions, purchased-ticket event information, attended event information, etc.). Venue account 334 can include information regarding the venue (e.g., information regarding events, seating, venue location, and other venue features). Memory 332 can be separate from the ticket server and can be used to store any number of user accounts 333 and venue accounts 334. Memory 332 can be distributed, e.g., have portions thereof disposed at a plurality of different locations. Other accounts may also be accessible by processor 331, such as accounts of users selling tickets that include ticket details, such as price, quantity, location, and event information, and financial information that enables funds to be deposited into seller accounts when their tickets are sold.

Ticket server 330 may include one or more servers located at one or more locations. Thus, the ticket server 330 can be geographically and operationally distributed if desired. Ticket server 330 can be part of another system, such as a payment provider system. Venue device 310 and/or third-party server 350 can communicate with ticket server 330 over a wired or wireless connection such as via a network. For example, venue device 310 and/or third-party server 350 can communicate with ticket server 330 via Internet 340. Venue device 310 and/or third-party server 350 can communicate with a plurality of different ticket servers 330. Ticket server 330 can communicate with a plurality of different venue devices 310 and/or third-party servers 350. A plurality of different ticket servers 330 can communicate among themselves and can be considered herein as being the same as a single ticket server 330. The user can operate user device 320 to interact with ticket server 330 so that the user can select, purchase, and or sell tickets (e.g., new tickets, resale tickets, or upgrade tickets) online.

Ticket server 330 can communicate with venue device 310 to obtain information about the venue. For example, ticket server 330 can communicate with venue device 310 to obtain information regarding the scheduling of events at the venue and regarding features of the venue. The features of the venue can be dependent upon the events of the venue, e.g., the features of the venue can vary from event to event.

Generally, venue device 310, mobile device 320, third-party server 350, and ticket server 330 can perform functions discussed herein. That is, at least to some extent, a function that is discussed herein as being performed via a particular one of these devices can be performed by a different one of these devices, by a combination of these devices, and/or by other devices.

Venue device 310, user device 320, third-party server 350, other mobile devices, and server 330 can communicate with one another via a network, such as the Internet 340. Venue device 310, user device 320, third-party server 350, other mobile devices, and server 330 can communicate with one another via one or more networks, such as local area networks (LANs), wide area networks (WANs), cellular telephone networks, and the like. Venue device 310, mobile devices such as user device 320, third-party server 350, server 330, and other devices can communicate with one another, at least partially, via one or more near field communications (NFC) methods or other short range communications methods, such as infrared (IR), Bluetooth, WiFi, and WiMax.

When a user wishes to shop for tickets online, resell tickets online, check in to an event venue online, access electronic tickets online, or provide location information online (as examples), the user can open an online ticket seller's website or can access the ticket seller using an application such as app 325. The user can open the ticket seller's website using user device 320, for example. The ticket seller's website can be hosted on ticket server 330, venue device 310, or on any other server or device.

Figure 4:
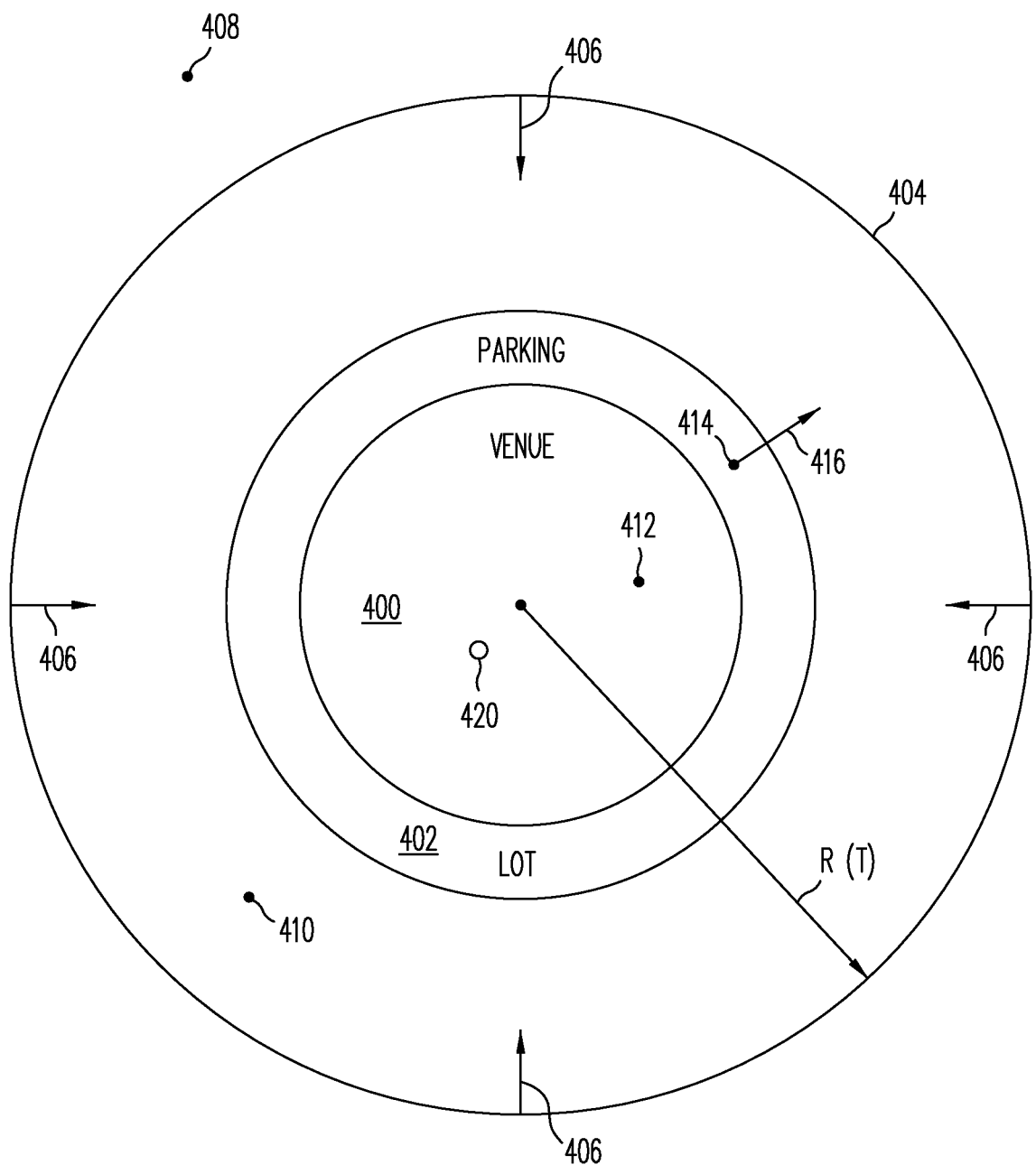
FIG. 4 is a diagram of an illustrative area around an event venue showing ticketholders at various locations around the venue according to an embodiment.

FIG. 4 is a diagram of an event venue and ticketholders having various locations in region surrounding the venue. As shown in FIG. 4, various users of a ticket server such as ticketholders 408, 410, 412, and 414 (e.g., ticket purchasers that own one or more tickets for an event or others to whom ticket purchasers have transferred their purchased tickets) may, at a time T, be at various locations in a region surrounding an event venue such as venue 400. Venue 400 may be a stadium, a theater, an arena, an amphitheater, or another venue at which ticketed events are held. Time T may be any time before or during an event at venue 400. In various embodiments, ticketed events such as the events that may be held at venue 400 can be social or recreational events, such as concerts, musicals, shows, fairs, amusement parks, sporting events and the like, business related events such as business meetings, conferences, retreats, and the like, user created events, or any other events for which tickets can be issued.

Ticketholders 408, 410, 412, and 414 may be users of a system such as system 100 of FIG. 1, users of a ticket server 330, users of user device 320, or users of another ticket distribution system. These users 408, 410, 412, and 414 or other users may each have an app such as app 325 of FIG. 3 that exchanges information such as ticket information, calendar information, and/or location information with the system.

A ticket server may define a particular area around venue 400 at a time T such as an area 404. In the example of FIG. 4, area 404 is a circular area having a radius R(T) that is a function of time T. For example, radius R(T) may have an initial value of 100 miles at a time T=24 hours prior to the event start time. However, it should be appreciated that this example is merely illustrative. If desired, time T may be any number of hours, days, minutes, seconds, weeks, months, etc. before the start or end of an event. Radius R(T) may have an initial value equal to any suitable distance from venue 400 (e.g., more than 100 miles, less than 100 miles, between 1 mile and 100 miles, between one mile and 500 miles, between 100 feet and 500 miles, or other suitable distance). Moreover, area 404 may have a non-circular shape. For example, some or all of the shape of area 404 may be determined by geographical features of the region surrounding venue 400 (e.g., a coastline, a body of water, a mountain, a political boundary, etc.).

As shown in FIG. 4, users may be located outside of area 404 (e.g., user 408), inside of area 404 and outside of venue 400 (e.g., users 410 and 414) and/or inside of venue 400 (e.g., user 412). In some embodiments, radius R(T) (and hence the size of area 404) may shrink as time passes (as indicated by arrows 406). For example, radius R(T) may be inversely proportional to time T or may have any other suitable inverse dependence on time T so that the size of area 404 is reduced as the event start time approaches.

A system such as system 100 and/or a ticket server such as ticket server 330 may perform attendance management operations based on determined locations of users at a given time T. Attendance management operations may include location-based resale activities such as pre-event location-based resale activities and/or event-concurrent location-based resale activities.

A system such as system 100 and/or a ticket server such as ticket server 330 may begin monitoring user locations at a particular time (e.g., an initial time T0=24 hours) before an event start time. At time T0 or at any time T after time T0, the system may determine that a user such as user 408 is outside of area 404. Based on the user's location outside of area 404, it may be determined that user 408 is at risk of missing the event. In contrast, it may be determined that a user such as user 410 is within area 404 and is therefore likely to attend the event. In various embodiments, additional user information may be received by the system and used to determine whether each particular user (e.g., each ticketholder) is likely or unlikely to attend the event. For users that are within area 404, no ticket resale action may be taken. For users that are outside of area 404, various actions may be taken by the system to determine whether the user will attend the event. For example, the user may be provided with an alert such as an email alert, a text message alert, a phone call alert, a social media alert or other alerts prompting the user to indicate whether they plan to attend the event.

In some embodiments, additional information such as the user's purchase history can be used to determine whether the user is likely to attend the event. For example, if the user is outside of area 404 but has purchased transportation into area 404 before the event start time, the user may be determined to be likely to attend the event and no ticket resale action may be taken. In contrast, if the user has purchased a hotel room in a distant city on the night of the event, the user may be determined to be unlikely to attend the event.

In response to determining that a user is unlikely to attend an event, the system may alert the user (e.g., via text message, email, social media, etc.) of opportunities for ticket resale (e.g., the user may receive an offer to sell the ticket back to the venue). In response to determining that a user is likely to attend an event, no ticket resale action may be taken. In some embodiments, the user's location may be re-determined at a later time and the process repeated.

At or near the start time of an event, the system may reduce the size of area 404 to the size of venue 400 or the size of a property associated with venue 400 such as a surrounding parking area 402 (for example). Once the even has started, the system may monitor the locations of users in and around venue 400. As shown in FIG. 4, a user 412 may be located within venue 400 during an event. During an event, it may also be determined that a user such as user 414 has left or is leaving the event. It may be determined that a user has left or is leaving the event by determining, as examples, that the user has a location outside of venue 400 during an event, that the user is moving away from venue 400 during an event (as indicated by arrow 416), or that the user has made a purchase (e.g., using a payment server associated with the system) at a merchant that is located outside the venue during the event.

In response to determining that a user is leaving or has left an event during the event, the system may alert the leaving user of options for their partially used tickets. For example, the user may be prompted to release (e.g., give up, and/or sell) vacated seats within venue 400 for which the leaving user has tickets. If the leaving user chooses to release the vacated seats, or if it is otherwise determined that the user has left and will not or cannot return, upgrade tickets for the vacated seats can be offered for sale to other attendees within venue 400 such as user 412.

For example, user 414 may purchase a ticket for a seat such as seat 420 in venue 400. When user 414 leaves venue 400 during the event, seat 420 may be offered for sale as an upgrade to user 412. In this way, a system such as system 100 and/or a ticket server such as ticket server 330 may perform dynamic event attendant management operations that help maximize the number of attendees at an event, provide the ability for attendees to upgrade their seats, and minimize the risk of loss of value for ticket purchasers who are unable or unwilling to attend an event and/or stay for an entire event.

Figure 5:
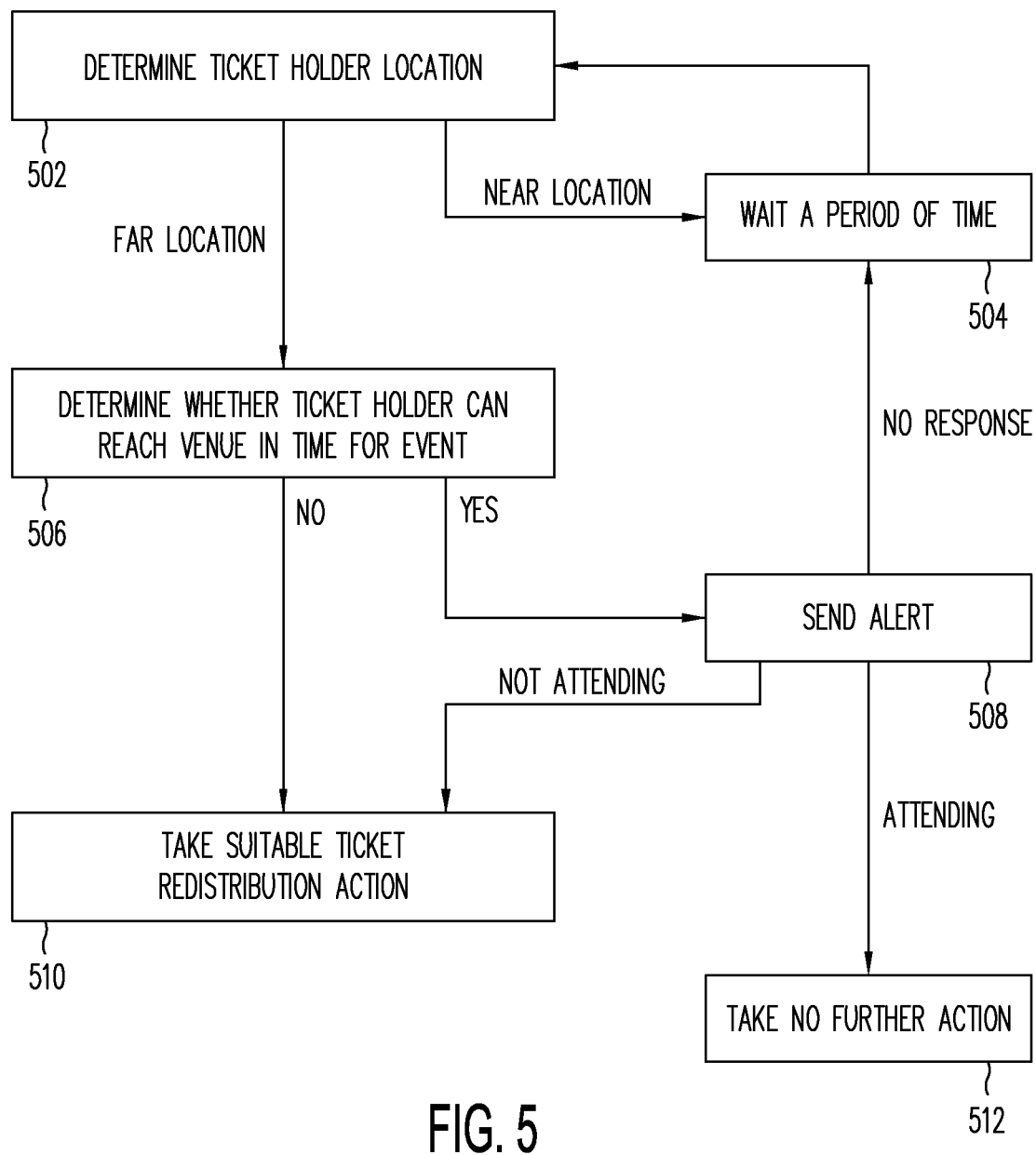
FIG. 5 is a flowchart showing an illustrative process that may be performed by a ticket provider for determining whether ticketholders are likely to attend an event and reselling tickets of ticketholders that are unlikely to attend the event according to an embodiment.
Figure 7:
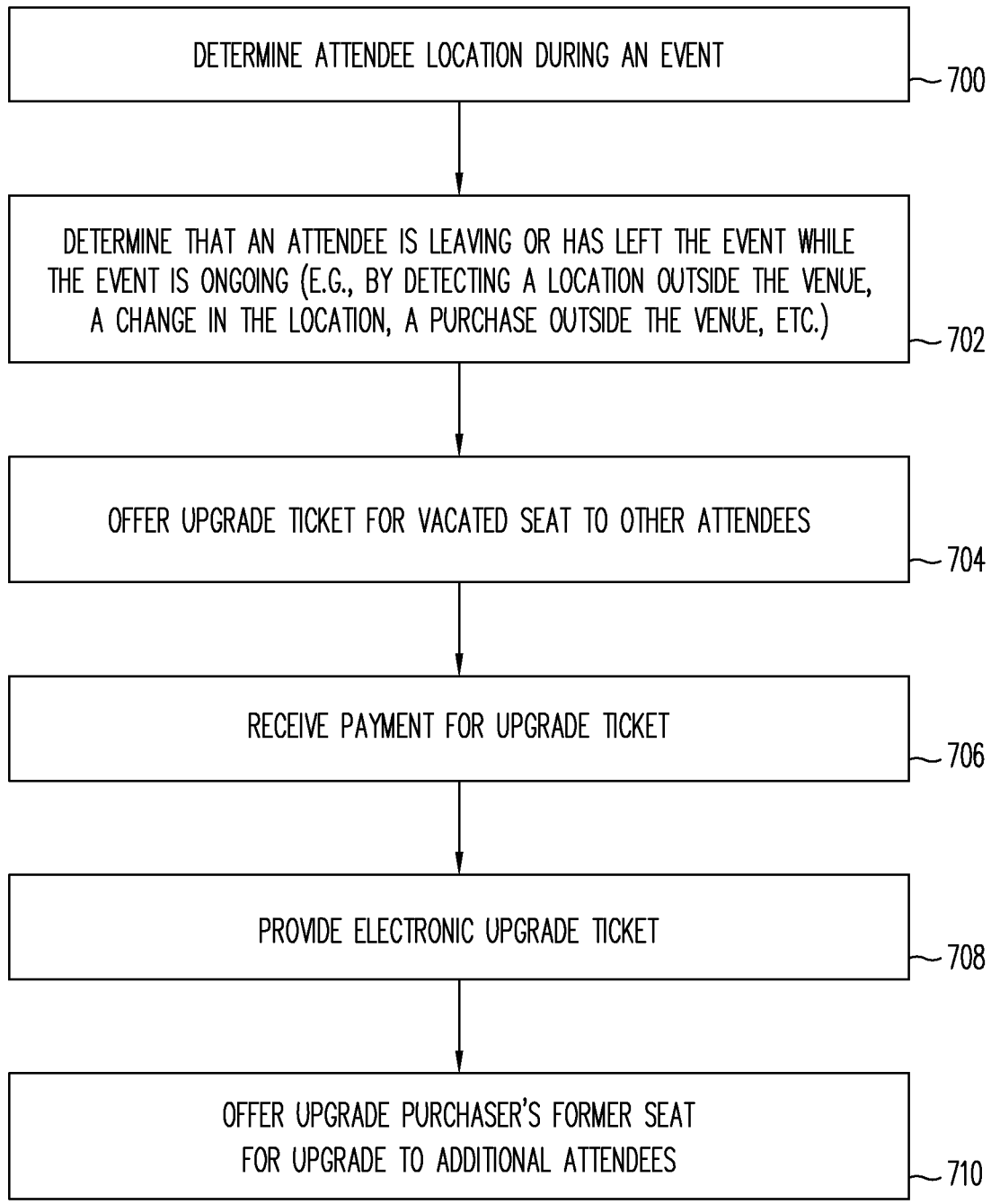
FIG. 7 is a flowchart showing an illustrative process that may be performed for reselling partially used tickets according to an embodiment.
Figure 8:
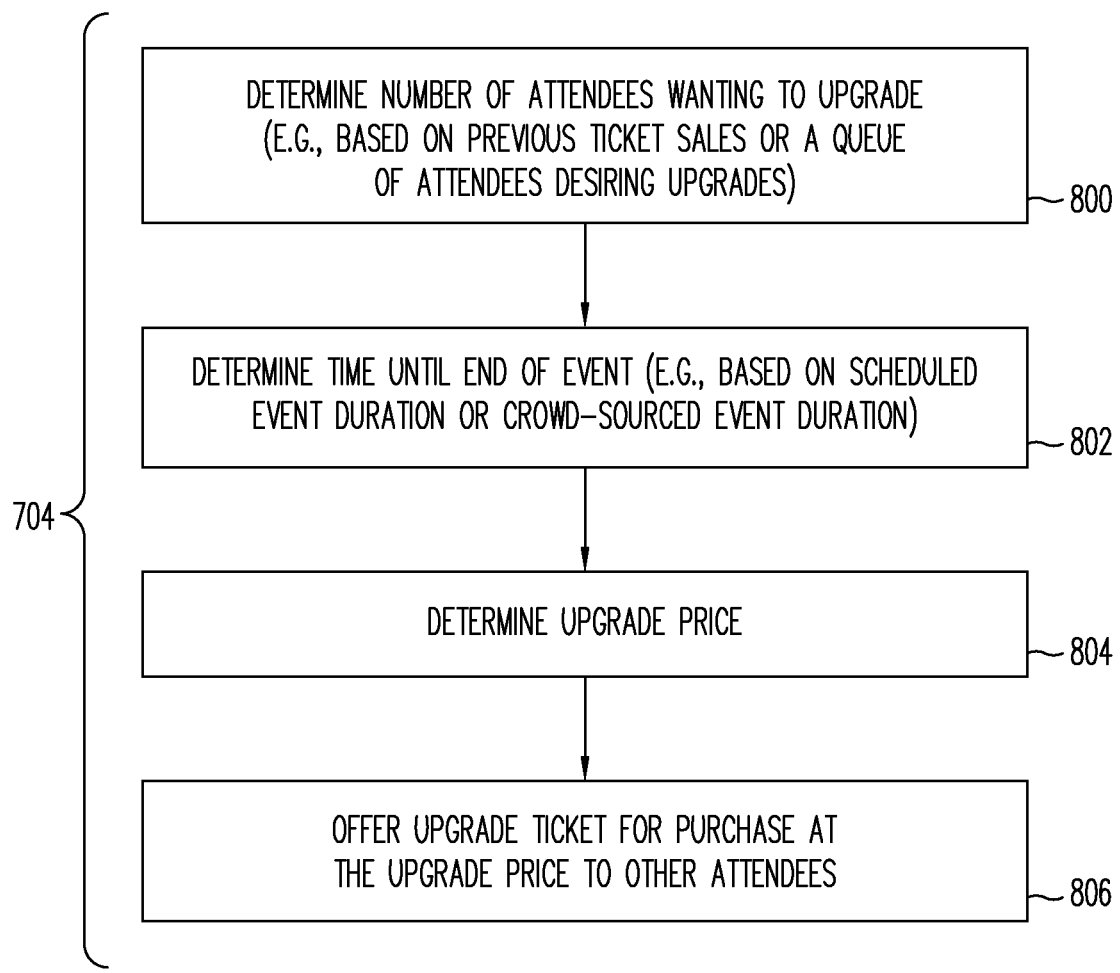
FIG. 8 is a flowchart showing an illustrative process that may be performed for offering seat upgrades to event attendees according to an embodiment.

Dynamic event management operations of this type may include location-based resale activities such as pre-event location-based resale activities and/or event-concurrent location-based resale activities. Once the location of a user having a ticket for a seat at an event has been determined (e.g., before or during an event), and it has been determined, based on the location, that the seat will be unused for all or a portion of the event, the seat may be offered for sale to another user. FIGS. 5, 6, 7, and 8 show examples of operations in which it can be determined based on a user location before or during an event that a seat will be unused for all or a portion of the event and in which the seat can be offered for sale to another user. FIGS. 5 and 6 are flowcharts illustrating example pre-event location-based resale activities. FIGS. 7 and 8 are flowcharts illustrating example event-concurrent location-based resale activities. The activities, processes, steps, operations, and/or actions described in connection with FIGS. 5, 6, 7, and/or 8 can be performed by a system such as system 100 of FIG. 1 and/or a system having a ticket server such as ticket server 330 of FIG. 3 (as examples).

FIG. 5 is a flowchart of illustrative steps that may be taken during pre-event location-based resale activities. The pre-event location-based resale activities of FIG. 5 may help reduce the number of ticketholders that do not attend the event while allowing ticketholders that are unable to attend the event to recoup some or all of the value of purchased and unused tickets.

At step 502, the location of a ticketholder may be determined. The location of the ticketholder may be determined using location data from a user device of the ticketholder (e.g., GPS data), based on recent purchases of the ticketholder, or other location information from or associated with the ticketholder. Determining the ticketholder location may include determining whether the ticketholder is at a "far" location (e.g., a location outside of a predefined area around an event venue such as area 404 of FIG. 4) or a "near" location (e.g., a location within the predefined area around an event venue).

In response to determining that the ticketholder is at a near location, the system (e.g., ticket server 330) may proceed to step 504. At step 504, the system may wait for a predetermined period of time before returning to step 502. The predetermined period of time may be any suitable time that is less than the time remaining until the event start time.

In response to determining that the ticketholder is at a far location, the system may proceed to step 506. At step 506, the system may determine whether the ticketholder can reach the venue for the event in time for the event. For example, the system may determine traffic conditions, weather conditions, flight schedules, train schedules, or other information that may indicate whether the ticketholder can physically get to the venue by the event start time.

In response to determining that the ticketholder cannot physically make it to the event by the event start time (e.g., by determining that the user has not made travel arrangements or that travel arrangements are not available), the system may proceed to step 510. At step 510, the system may take suitable ticket redistribution action. For example, the system may send an alert to the ticketholder. The alert may prompt the ticketholder to indicate whether the ticketholder wishes to sell the ticket back to the venue (e.g., at a full ticket price, a reduced ticket price, an increased ticket price, or at a full ticket price subtracting a resale fee). If the ticketholder responds indicating that the ticketholder wishes to resell the ticket, the system may re-purchase (buy back) the ticket and resell the ticket to another user.

In response to determining that the ticketholder can physically make it to the event by the event start time (e.g., by determining that the user has made travel arrangements or that travel arrangements are available), the system may proceed to step 508. At step 508, the system may send an alert to the ticketholder. The alert may prompt the ticketholder to indicate whether the ticketholder plans to attend the event.

If, after sending an alert to the ticketholder at step 508, the user does not respond, the system may return to step 504. If after sending an alert to the ticketholder at step 508, the ticketholder responds indicating that the ticketholder will attend the event, the system may proceed to step 512. At step 512, pre-event location-based ticket resale operations for that ticketholder may be terminated. If, after sending an alert to the ticketholder at step 508, the ticketholder responds indicating that the ticketholder will not attend the event, the system may proceed to step 510.

Figure 6B:
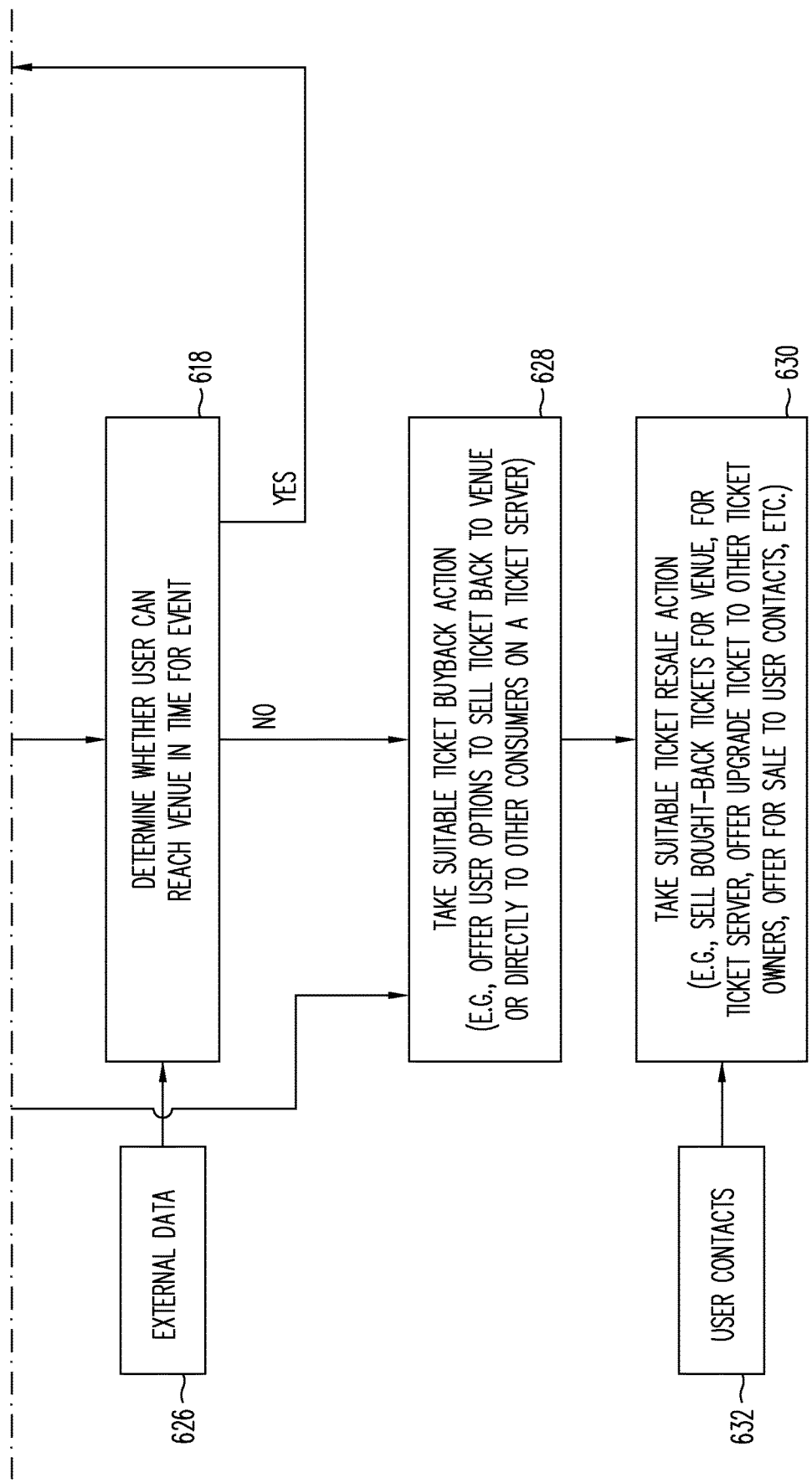
FIGS. 6A and B combine to show a flowchart showing further details of an illustrative process that may be performed by a ticket provider for determining whether ticketholders are likely to attend an event and reselling tickets of ticketholders that are unlikely to attend the event according to an embodiment.

FIG. 6 (divided for clarity into FIGS. 6A and 6B as indicated in the figure) is a flowchart showing further details of illustrative steps that may be taken during pre-event location-based resale activities.

At step 602, a system such as system 100 or ticket server 330 may begin event attendance monitoring for a particular event to be held at a venue. Event attendance monitoring may begin at a time T0 prior to a start time for the event.

At step 604, an area around the venue may be determined. The area may be dependent on the time T until a start time for the event. Determining the area may include determining, at a time T (e.g., time T0 or anytime time T between time T0 and the event start time), a radius R(T). However, it should be appreciated that a radius of a circular area is merely illustrative. In various embodiments, at step 604, an area having one or more borders defining any suitable shape and any suitable size around the venue may be determined.

An area of any suitable size and shape around a venue may be time independent or may depend on time T.

At step 606, the location of at least one user of the system (e.g., a ticketholder) may be determined. As described herein, the location of the user may be determined from location data (e.g., GPS data) from a user device of the user, from user-reported location data, from user purchase data, or other location-indicating data.

At step 608, the user location may be compared with the area determined at step 604 (e.g., a circular area of radius R(T)) to determine whether the location of the user is within the determined area around the venue.

If the user location is outside the area (e.g., further from the venue than R(T)), the system may determine that the user is in a far location. If the user location is within the area (e.g., closer to the venue than R(T)), the system may determine that the user is in a near location.

In response to determining that the user is at a near location, the system (e.g., ticket server 330) may proceed to step 616. At step 616, the system may wait for a predetermined period of time before returning to step 604. The predetermined period of time may be any suitable time that is less than the time remaining until the event start time.

In response to determining that the ticketholder is at a far location, the system may proceed to step 610. At step 610, the system may determine whether the user plans to attend the event. At step 610, the system may also obtain, receive, access, or gather additional information associated with the user that may help determine whether the user plans to attend the event. The additional information may include purchase history information 620, calendar information 624, and location history information 622 (as examples).

Purchase history information 620 may include information associated with recent purchases made by the user such as travel purchases (e.g., airline ticket purchases, train ticket purchases, rental car purchases, or hotel purchases). Purchase history information 620 can be used to determine whether the user plans to attend the event. For example, the system may gather purchase history information that indicates that the user is in a far location and has purchased a return airplane ticket to the city in which the venue is located on a date that is after the date of the event, thereby indicating that the user is not planning to attend the event. In contrast, the system may gather purchase history information that indicates that the user is in a far location and has purchased a return airplane ticket to the city in which the venue is located on the date of the event, thereby indicating that the user is planning attend the event.

Calendar information 624 may include, as examples, information transmitted from the user's device indicating events in the user's electronic calendar on the device or online calendar information of the user (e.g., a social network calendar or other public online calendar). Calendar information 624 may, together with or separately from purchase history information 620, be used to determine whether the user plans to attend the event. For example, if the user is in a far location and doesn't have a calendar appointment related to the event, the system may determine that the user is not planning to attend the event.

Location history information 622 may include location information (e.g., GPS data and/or location-based purchase data) that indicates the recent movements of the user. Location history information 622 may, together with or separately from purchase history information 620 and/or calendar information 624, be used to determine whether the user plans to attend the event. For example, if it is determined that the user is at a far location but has been making progress toward the event venue, then it may be determined that the user plans to attend the event. In contrast, if it is determined that the user is at a far location and has been moving away from the event venue, then it may be determined that the user does not plan to attend the event.

Information such as purchase history information 620, calendar information 624, and location history information 622 may be gathered by a ticket server, provided by a user device, or otherwise obtained by a system for managing event attendance and may be combined in any suitable way for determining whether a user is likely planning to attend an event for which the user has purchased or been transferred tickets.

In response to determining that the user is a planning to attend the event, the system (e.g., ticket server 330) may proceed to step 616. At step 616, the system may wait for a predetermined period of time before returning to step 604. The predetermined period of time may be any suitable time that is less than the time remaining until the event start time.

In response to determining that the user is not planning to attend the event, the system (e.g., ticket server 330) may proceed to step 612. At step 612, the alert may prompt the ticketholder to indicate whether the ticketholder plans to attend the event. The alert may be a text message alert, an API alert on the user device, an email alert, a telephone call alert, or other suitable alert.

If, after sending an alert to the user at step 612, the user does not respond, the system may proceed to step 618. If, after sending an alert to the user at step 612, the user responds indicating that the ticketholder will attend the event, the system may proceed to step 614. At step 614, pre-event location-based ticket resale operations for that ticketholder may be terminated. If, after sending an alert to the ticketholder at step 612, the ticketholder responds indicating that the ticketholder will not attend the event, the system may proceed to step 628.

At step 618, the system may determine whether the user can reach the event venue in time for the event (e.g., whether it is possible for the user to reach the event venue at or before the start time of the event). The system may use purchase history information 620, calendar information 624, location history information 622, and or other information such as external data 626 to determine whether the user can reach the venue in time for the event. External data 626 may include traffic conditions in the vicinity of the venue, weather conditions, flight schedules associated with the user's location and the venue location, train schedules, or other information that may indicate whether the user can physically get to the venue by the event start time.

For example, if it is determined that the user is at a far location (e.g., based on the user's GPS location, purchase history, app check-ins or other data) and it is also determined that, for example, the distance between the user's location and the venue cannot be travelled using any conventional travel means, it may be determined that the user cannot reach the venue in time for the event.

In one illustrative scenario, a user may have a ticket for a concert at the Austin Music Hall in Austin, Tex. at 7 pm on a Friday. The system may determine that the user has been making purchases in Lima, Peru and that the user has no return flight scheduled before the event. The system may also determine (e.g., by making API calls to travel websites and/or running travel heuristic analyses) an estimated travel time between Lima, Peru and Austin, Tex., USA. API calls may include API calls to travel services servers, major flight carrier servers, or other travel servers for estimating the travel time. In some situations, API calls may not be available and a travel heuristic analysis can be performed using the GPS coordinates of the user and the venue, and accounting for travel over various methods of transportation, to estimate the time needed for the user to reach the venue. It should be appreciated that this illustrative scenario is merely an example, and that the principles described for determining whether a user can reach an event venue in time for an event can be applied in various other scenarios.

In response to determining (at step 618) that it is still possible for the user to reach the event venue in time for the event, the system may return to step 616.

In response to determining (at step 618) that it is not possible for the user to reach the event venue in time for the event, the system may proceed to step 628.

At step 628, the system may take suitable ticket buyback action. Ticket buyback action may include offering options to the user (e.g., via a user alert) for selling the ticket back to the venue or directly to other consumers on a ticket server, (as examples). For example, a ticket server may send the user an alert (e.g., via text message, API, email, or the like) with text stating "Would you like to sell your ticket back to the venue since it looks like you won't make the show?" If the user chooses to sell back the ticket, the system may facilitate buyback of the ticket by the venue or by another buyer. Buyback actions may include buying back the ticket from the user at a reduced price, at a face value price, at an increased price, at a price determined by market conditions (e.g., the popularity of the event), or at any suitable price.

At step 630, the system may take suitable ticket resale action. For example, the system may facilitate selling of resale tickets (e.g., tickets that have been bought-back at step 628) for a venue or for the ticket server itself, may facilitate offering the resale tickets as an upgrade resale ticket to other ticketholders, or may facilitate offering the resale ticket for sale to user contacts 32 such as user email contacts, user social media contacts, or other known contacts of the user. For example, the system may access the user's social network accounts to determine if any of the user's friends, family, coworkers, or other contacts have expressed interest in the event, the event artist or attraction, the event venue, or similar event artists or attractions.

A ticket seller such as a venue owner, event owner, or other ticket seller may be provided with options for configuring their preferences for buying back and reselling bought-back tickets. For example, a venue may offer to directly buy back tickets from users and then offer for sale the same tickets (e.g., on a ticket server webpage or a ticket server application on user devices). In another example, the venue may offer to directly buy back tickets from user and then offer seating upgrades (e.g., upgrade resale tickets) to other existing ticketholders and later buy back and resell tickets for the newly vacated seats from the other existing ticketholders. The processes described in connection with FIGS. 5 and 6 may be performed in any suitable order and repeated any suitable number of times until, for example, the venue is completely occupied. Potential event attendees without tickets who are located near the venue or who have previously expressed an interest in the event can also be alerted that new seats are available through, for example, a ticket server application on their user devices when ticketholders sell back tickets. By moving patrons up closer to an attraction area such as a concert stage and bringing in new attendees (if needed to fill capacity), these dynamic event attendance management activities may help the venue reach and maintain a maximum occupancy.

FIG. 7 is a flowchart of illustrative steps that may be taken during event-concurrent location-based resale activities. The event-concurrent location-based resale activities of FIG. 7 may help ticket purchasers recoup some or all of the value of purchased partially used tickets and/or may help event owners and/or venue owners extract additional value from partially used tickets by selling upgrade tickets for vacated seats associated with the partially used tickets. Partially used tickets may be tickets that have been used by a ticketholder to gain admission to an event venue, but that are abandoned by the ticketholder before the event is over.

At step 700, the system may determine the location of an event attendee during an event. The location of the event attendee may be determined using, for example, GPS data from a device of the user, purchase information (e.g., information identifying purchases made at the venue or outside the venue), social media posts, or other location data provided by or obtained from or about the attendee.

At step 702, the system may determine that an attendee is leaving or has left the event while the event is ongoing. The system may determine that the attendee is leaving or has left the event by detecting the attendee leaving the event (e.g., by detecting a location of the attendee that is outside of the event venue, detecting a change in the attendee location by detecting that the attendee is moving away from the venue, and/or detecting a purchase made by the attendee at a location that is outside of the venue). In some embodiments the system may also send an alert to the leaving attendee (e.g., by text message, by email, by API alert on the user device) prompting the leaving attendee to confirm that they are leaving the event. In some embodiments, that alert may include options for ticket resale and/or buyback.

At step 704, the system may offer an upgrade ticket for a vacated seat of the leaving attendee to other attendees that are known (based on their determined locations) to be at the venue. In some embodiments, the system may compile a list of vacated seats and provide a list of associated upgrade tickets for sale on a ticket server webpage or API server.

At step 706, the system may receive payment from another attendee for the upgrade ticket. The system may receive payment from the other attendee via a payment app or ticket server app on the user's mobile device (as examples).

At step 708, the system may provide an electronic upgrade ticket to the other attendee that can be displayed on the user's mobile device so that the other attendee can gain access to the vacated seat associated with the upgrade ticket.

At step 710, the newly vacated seat of the other attendee that purchased the upgrade ticket can be offered as an upgrade to additional attendees of the event.

FIG. 8 is a flowchart of illustrative steps that may be performed for offering an upgrade ticket for a vacated seat as described above in connection with step 704 of FIG. 7.

At step 800, the number of attendees wanting to upgrade may be determined. For example, the system may determine, based on previous ticket sales (e.g., the popularity of tickets for the event during an initial sales period and/or during pre-event location-based resale activities) and/or based on a queue of other attendees desiring upgrades (e.g., a list of attendees that have indicated using a ticket server app on their mobile devices that they are interested in upgrade tickets), an exact or approximate number of attendees that are interested in upgrades. Attendees that have expressed interest in an upgrade may have provided pre-authorization to purchase upgrade tickets at a particular price and within a particular distance of the attraction area (e.g., a concert stage, a playing field, etc.).

At step 802, the time remaining until the end of the event may be determined. The remaining time may be determined based on the scheduled event duration and actual event start time and/or based on a crowd-sourced event duration. For example, attendees of previous concerts of an artist may post comments online, on a ticket server webpage, on social medial webpages, or otherwise publish information about previous concerts for that artist that indicates that the artist typically plays longer or shorter than the scheduled event duration. This type of attendee published information can be collected and combined to determine a crowd-sourced event duration. However, this is merely illustrative. In another example, a crowd-sourced event duration may be determined based on the GPS location history of various attendee devices. The UPS location history for the attendee devices may be collected and the system can analyze, for example, the amount of time each person is in the vicinity of the event venue. A crowd-sourced event end time for the event may be determined, for example, as the time (e.g., an average time or a median time) when some or all of the attendees (e.g., a majority of the attendees) disperses from the event venue. Additional crowd-sourced event duration information such as encore information, overtime information, or the like may be determined based on a detection of a subset of the event attendees lingering in or around the event venue after a large attendee dispersal event has already been detected.

At step 804, an upgrade price for upgrade tickets for vacated seats may be determined. The upgrade price may be determined based on the number of attendees wanting an upgrade, the time until the end of the event, or other suitable ticket marketing information. For example, a relatively high number of attendees wanting an upgrade when a relatively large amount of time remains in the event may cause the system to set a relatively high price for an upgrade ticket. In contrast, a relatively low number of attendees wanting an upgrade when a relatively small amount of time remains in the event may cause the system to set a relatively low price for an upgrade ticket. However, this is merely illustrative. In various embodiments, the upgrade price may rise or fall depending on the amount of time remaining in the event. For example, a price increase may be used just before an encore portion of a concert when demand for upgrades may spike.

At step 806, an upgrade ticket may be offered for purchase at the determined upgrade price to other attendees. Following offering the upgrade ticket for sale at the upgrade price, the system may proceed, for example, to step 706 of FIG. 7.

The processes described in connection with FIGS. 7 and 8 may be performed in any suitable order and repeated any suitable number of times until, for example, the event has ended.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. A system, comprising:
 a server communicatively coupled to a first user device of a first user and to one or more venue devices distributed over a venue that hosts an event, the first user device being associated with an account of the first user who has purchased an electronic ticket for a seat at the event, the server including a memory configured to store event information associated with an event and a processor coupled to the memory, the server configured to perform operations comprising:
 retrieve event information including a start time, duration, and a feature of the venue from a network-accessible event database including the one or more venue devices;
 receive, from the one or more venue devices via a short range communication method, a signal indicative of a location data of the first user device, wherein the location data is generated by a positioning system component in the first user device and provided by the first user device to the one or more venue devices via the short range communication method;
 determine, based on the signal and the short range communication method from the one or more of the venue devices, a first area at a first time according to a variable area around the venue that varies as a function of time and is based on the start time and duration of the event from the network-accessible event database, wherein the variable area is greater than and encompasses a venue area during the duration of the event at the venue;
 access, from the server and concurrent with the event, the location data;
 determine whether a location of the first user device was at the venue during the event and is outside the first area at the first time based on the location data of the first user device, the location data based on purchase information associated with the first user that identifies a purchase after the first time made by the first user at a merchant that is located outside of the venue for the event;
 evaluate a risk that the seat will be unused for all or a portion of the event based on the location of the first user device;
 in response to determining the first user device was at the venue during the event and the location of the first user device being outside the first area at the first time and the risk indicating the seat will be unused, send an alert to the first user device requesting an indication of a release of the seat at the event;
 in response to receiving a response from the first user affirming the release of the seat, transmit an offer of the seat vacated by the first user to a second user device associated with a second user; and
 provide a view of at least the first area, the seat, or a portion of the venue, to a graphical user interface in the first user device for display to the first user.

2. The system defined in claim 1, wherein the server is further configured to:
 access a third database storing a flight schedule of the first user; and
 determine the seat will be unused for all or a portion of the event further based on the flight schedule.

3. The system defined in claim 1, wherein the variable area corresponds to the venue area between the start time and an end time of the event.

4. The system defined in claim 3, wherein the server is further configured to determine an upgrade price for the seat based on a time remaining in the event, wherein the offer comprises the upgrade price.

5. A computer implemented method, comprising:
 retrieving, at a server, an event information including a start time, duration, and venue of an event from a network-accessible event database, the event information provided by a one or more venue devices distributed over the venue that hosts the event;

receiving, from the one or more venue devices via a short range communication method, a signal indicative of a location of a first user device, wherein the signal is generated by a positioning system component in the first user device and provided by the first user device to the one or more venue devices via the short range communication method, and wherein the first user device is associated with an electronic ticket for a seat at the event;

determining, at the server, based on the signal and the short range communication method, a first area at a first time according to a variable area around the venue that varies as a function of time and is based on the start time and duration of the event from the network-accessible event database, wherein the variable area is greater than and encompasses a venue area during the duration of the event at the venue;

accessing, form the server and concurrent with the event, the location of the first user device;

determining, at the server, whether the location of the first user device was at the venue during the event and is outside the first area at the first time based on the location of the first user device, based on purchase information associated with the first user device that identifies a purchase after the first time made with the first user device at a merchant that is located outside of the venue for the event;

evaluating, at the server, a risk that the seat will be unused for all or a portion of the event based on the location of the first user device;

in response to determining the first user device was at the venue during the event and the location of the first user device being outside the first area at the first time and the risk indicating the seat will be unused, sending, by the server, an alert to the first user device requesting an indication of a release of the seat at the event;

in response to receiving a response from the first user device affirming the release of the seat, transmitting, by the server, an offer of the seat vacated by a first user to a second user device associated with a second user; and providing a view of at least the first area, the seat, or a portion of the venue, to a graphical user interface in the first user device for display to the first user.

6. The method defined in claim 5, further comprising: determining, electronically by the server, an upgrade price for the seat based on a number of attendees wanting to purchase an upgrade.

7. The method defined in claim 5, further comprising: determining, electronically by the server an upgrade price for the seat based on a remaining time for the event that is based on a scheduled or crowd-sourced event duration.

8. The method defined in claim 5, further comprising: receiving a user selection from the second user device; and
transmitting another offer of an additional seat that is associated with the second user to a third user device associated with a third user.

9. The method defined in claim 5, wherein the variable area around the venue corresponds to the venue area between the start time and an end time of the event.

10. The method defined in claim 5, wherein determining the seat will be unused for all or a portion of the event comprises determining, electronically by the server whether the first user has vacated the seat for the event based on the location of the first user device, purchase history, calendar information, or location history.

11. A non-transitory machine-readable medium having a plurality of machine-readable instructions which, when executed by one or more processors of a server, are adapted to cause the server to perform a method comprising:

retrieving, at the server, an event information including a start time, duration, and venue of an event from a network-accessible event database, the event information provided by a one or more venue devices distributed over the venue that hosts the event;

receiving, from the one or more venue devices via a short range communication method, a signal indicative of a location of a first user device, wherein the location of the first user device is generated by a positioning system component in the first user device and provided by the first user device to the one or more venue devices via the short range communication method, and wherein the first user device is associated with an electronic ticket for a seat at the event;

determining at the server, based on the signal and the short range communication method, a first area at a first time according to a variable area around the venue that varies as a function of time and is based on the start time and duration of the event from the network-accessible event database, wherein the variable area is greater than and encompasses a venue area;

accessing, from the server and concurrent with the event, the location of the first user device;

determining whether the location of the first user device was at the venue during the event and is outside the first area at the first time based on the location of the first user device, based on purchase information associated with the first user device that identifies a purchase after the first time made with the first user device at a merchant that is located outside of the venue for the event;

evaluating a risk that the seat will be unused for all or a portion of the event based on the location of the first user device;

in response to determining the first user device was at the venue during the event and the location of the first user device being outside the first area at the first time and the risk indicating the seat will be unused, sending an alert to the first user device requesting an indication of a release of the seat at the event;

in response to receiving a response from the first user device affirming the release of the seat, transmitting an offer of the seat vacated by a first user to a second user device associated with a second user; and providing a view of at least the first area, the seat, or a portion of the venue, to a graphical user interface in the first user device for display to the first user.

12. The non-transitory machine-readable medium defined in claim 11, wherein-the variable area around the venue corresponds to the venue area between the start time and an end time of the event.

* * * * *